(12) United States Patent
Kuo et al.

(10) Patent No.: US 10,887,174 B2
(45) Date of Patent: *Jan. 5, 2021

(54) GROUP COMMAND MANAGEMENT FOR DEVICE GROUPS

(71) Applicant: Amazon Technologies, Inc., Seattle, WA (US)

(72) Inventors: Calvin Yue-Ren Kuo, Mercer Island, WA (US); William Alexander Stevenson, Seattle, WA (US); Mark Edward Rafn, Cambridge (GB); James Christopher Sorenson, III, Seattle, WA (US); Jonathan I. Turow, Seattle, WA (US); Shyam Krishnamoorthy, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/269,770

(22) Filed: Sep. 19, 2016

(65) Prior Publication Data

US 2018/0083836 A1 Mar. 22, 2018

(51) Int. Cl.
*H04L 12/24* (2006.01)
*H04L 12/28* (2006.01)
(Continued)

(52) U.S. Cl.
CPC ........ *H04L 41/0893* (2013.01); *H04L 12/281* (2013.01); *H04L 12/2816* (2013.01);
(Continued)

(58) Field of Classification Search
CPC ......... H04L 67/12; H04L 67/16; H04L 67/20; H04L 67/26; H04L 67/28; H04L 67/2833;
(Continued)

(56) References Cited

U.S. PATENT DOCUMENTS 10,575,153 B2 * 2/2020 Ly ............................ H04W 4/50
2003/0233436 A1 * 12/2003 Slemmer .............. G05B 13/028
709/223
(Continued)

OTHER PUBLICATIONS

Guth J, Breitenbücher U, Falkenthal M, Leymann F, Reinfurt L. Comparison of IoT platform architectures: A field study based on a reference architecture. InCloudification of the Internet of Things (CIoT) Nov. 23, 2016 (pp. 1-6). IEEE. (Year: 2016) (Year: 2016).*

(Continued)

*Primary Examiner* — John A Follansbee
*Assistant Examiner* — James N Fiorillo
(74) *Attorney, Agent, or Firm* — Thorpe North & Western, LLP.

(57) ABSTRACT

A technology is described for operating a device shadowing service that manages commands associated with groups of device representations. An example method may include receiving a group command associated with a group of device representations managed by a device shadowing service. Device representations included in the group of device representations represent physical devices that connect to the device shadowing service over one or more computer networks. In response to the group command, the device representations included in the group of device representations may be identified and an instruction to perform an action indicated by the group command may be sent to the physical devices represented by the device representations. Thereafter, indications may be received that at least a portion of the physical devices performed the action.

21 Claims, 8 Drawing Sheets

(51) Int. Cl.
*H04L 29/12* (2006.01)
*H04L 29/08* (2006.01)

(52) U.S. Cl.
CPC ........ *H04L 41/082* (2013.01); *H04L 61/2069* (2013.01); *H04L 67/12* (2013.01)

(58) Field of Classification Search
CPC . H04L 67/2842; H04L 61/2069; H04L 41/18; H04L 41/0893; H04L 67/14; H04L 67/34; H04L 41/14; H04L 41/082; H04L 12/281; H04L 12/2816
USPC .......................... 709/213, 220, 221, 224–226
See application file for complete search history.

(56) References Cited

U.S. PATENT DOCUMENTS

| | | | | |
|---|---|---|---|---|
| 2007/0288623 | A1* | 12/2007 | Kato | H04L 63/102 709/223 |
| 2009/0217188 | A1* | 8/2009 | Alexander | G06F 3/04817 715/771 |
| 2013/0159451 | A1* | 6/2013 | Luciw | H04L 67/2842 709/213 |
| 2014/0241354 | A1* | 8/2014 | Shuman | H04L 12/281 370/390 |
| 2014/0244568 | A1* | 8/2014 | Goel | H04W 4/08 706/224 |
| 2014/0244834 | A1* | 8/2014 | Guedalia | H04W 4/08 709/224 |
| 2014/0244838 | A1* | 8/2014 | Ryu | H04W 4/38 709/224 |
| 2015/0007038 | A1* | 1/2015 | Sasaki | G06F 3/0484 715/736 |
| 2015/0033312 | A1* | 1/2015 | Seed | H04W 4/60 726/7 |
| 2015/0116811 | A1* | 4/2015 | Shrivastava | G08C 17/02 359/275 |
| 2015/0130957 | A1* | 5/2015 | Berelejis | H04L 67/12 348/211.1 |
| 2015/0134761 | A1* | 5/2015 | Sharma | H04L 67/22 709/207 |
| 2015/0237071 | A1* | 8/2015 | Maher | H04L 67/1068 726/1 |
| 2015/0249672 | A1* | 9/2015 | Burns | G06F 21/629 726/4 |
| 2015/0256385 | A1* | 9/2015 | Chandhok | H04L 41/18 715/734 |
| 2015/0319046 | A1* | 11/2015 | Plummer | H04L 12/2834 715/736 |
| 2015/0365480 | A1* | 12/2015 | Soto | H04L 12/281 709/224 |
| 2016/0041534 | A1* | 2/2016 | Gupta | H04W 4/70 700/275 |
| 2016/0043962 | A1* | 2/2016 | Kim | H04W 4/08 709/224 |
| 2016/0057020 | A1* | 2/2016 | Halmstad | H04L 67/26 715/740 |
| 2016/0072638 | A1* | 3/2016 | Amer | H04L 67/125 398/106 |
| 2016/0088438 | A1* | 3/2016 | O'Keeffe | H04W 4/21 455/456.2 |
| 2016/0112262 | A1* | 4/2016 | Johnson | H04L 61/1511 709/221 |
| 2016/0165650 | A1* | 6/2016 | Kim | H04W 12/003 370/329 |
| 2016/0249439 | A1* | 8/2016 | Recker | H05B 45/00 |
| 2016/0285840 | A1* | 9/2016 | Smith | H04W 12/0023 |
| 2016/0364553 | A1* | 12/2016 | Smith | H04W 12/0401 |
| 2016/0378520 | A1* | 12/2016 | Dow | G06F 9/45533 718/1 |
| 2017/0006030 | A1 | 1/2017 | Krishnamoorthy et al. | |
| 2017/0055126 | A1* | 2/2017 | O'Keeffe | H04W 4/023 |
| 2017/0063946 | A1* | 3/2017 | Quan | H04L 67/20 |
| 2017/0064042 | A1* | 3/2017 | Vora | H04W 4/70 |
| 2017/0083396 | A1* | 3/2017 | Bishop | G06F 11/1438 |
| 2017/0126486 | A1* | 5/2017 | Prieto | H04L 41/082 |
| 2017/0141968 | A1* | 5/2017 | Lloyd | H04L 41/0886 |
| 2017/0195136 | A1* | 7/2017 | Ghosh | H04L 45/04 |
| 2017/0223130 | A1* | 8/2017 | Profit | H04L 67/16 |
| 2017/0223479 | A1* | 8/2017 | Ly | H04L 41/0893 |
| 2017/0284691 | A1* | 10/2017 | Sinha | F24F 11/62 |
| 2017/0311368 | A1* | 10/2017 | Kandur Raja | H04W 4/80 |
| 2017/0322904 | A1* | 11/2017 | Jenks | H04W 4/70 |
| 2017/0329636 | A1* | 11/2017 | Azmoon | G06F 15/02 |
| 2018/0004503 | A1* | 1/2018 | OlmstedThompson | G06F 9/45533 |
| 2018/0084064 | A1* | 3/2018 | Starsinic | H04L 67/14 |
| 2018/0097651 | A1* | 4/2018 | Guedalia | H04W 84/18 |
| 2018/0321356 | A1* | 11/2018 | Kulkarni | G06Q 10/087 |
| 2019/0296967 | A1* | 9/2019 | Yang | H04L 41/0816 |
| 2020/0059765 | A1* | 2/2020 | Ocak | H04L 1/0893 |

OTHER PUBLICATIONS

Mainetti L, Mighali V, Patrono L, Rametta P, Oliva SL. A novel architecture enabling the visual implementation of web of Things applications. In2013 21st International Conference on Software, Telecommunications and Computer Networks-(SoftCOM 2013) Sep. 18, 2013 (pp. 1-7). IEEE. (Year: 2013).*

Serbanati A, Medaglia CM, Ceipidor UB. Building blocks of the internet of things: State of the art and beyond. InDeploying RFID-Challenges, Solutions, and Open Issues Aug. 17, 2011. IntechOpen. (Year: 2011) (Year: 2011) (Year: 2011).*

Tiloca M, Nikitin K, Raza S. Axiom: DTLS-based secure IoT group communication. ACM Transactions on Embedded Computing Systems (TECS). Apr. 28, 2017;16(3):1-29. (Year: 2017).*

Serbanati A, Medaglia CM, Ceipidor UB. Building blocks of the internet of things: State of the art and beyond. InDeploying RFID-Challenges, Solutions, and Open Issues Aug. 17, 2011. IntechOpen. (Year: 2011).*

Guth J, Breitenbücher U, Falkenthal M, Leymann F, Reinfurt L. Comparison of IoT platform architectures: A field study based on a reference architecture. InCloudification of the Internet of Things (CIoT) Nov. 23, 2016 (pp. 1-6). IEEE. (Year: 2016) (Year: 2016) Year: 2016).*

Iloca M, Nikitin K, Raza S. Axiom: DTLS-based secure IoT group communication. ACM Transactions on Embedded Computing Systems (TECS). Apr. 28, 2017;16(3):1-29. (Year: 2017) (Year: 2017).*

Serbanati A, Medaglia CM, Ceipidor UB. Building blocks of the internet of things: State of the art and beyond. InDeploying RFID-Challenges, Solutions, and Open Issues Aug. 17, 2011. IntechOpen. (Year: 2011) (Year: 2011).*

Guth J, Breitenbücher U, Falkenthal M, Leymann F, Reinfurt L. Comparison of IoT platform architectures: A field study based on a reference architecture. InCloudification of the Internet of Things (CIoT) Nov. 23, 2016 (pp. 1-6). IEEE. (Year: 2016) (Year: 2016) Year: 2016).*

International Search Report for International Application No. PCT/US2017/051415 dated Dec. 22, 2017, 4 pages, Netherlands.

* cited by examiner

GROUP COMMAND MANAGEMENT FOR DEVICE GROUPS

RELATED APPLICATIONS

This application is related to U.S. Utility patent applications entitled "DYNAMIC GROUPING OF DEVICE REPRESENTATIONS" and "AGGREGATED GROUP STATE FOR A GROUP OF DEVICE REPRESENTATIONS" filed concurrently on Sep. 19, 2016, and are incorporated by reference herein.

BACKGROUND

Electronic devices have become ever-present in many aspects of society. During the course of a normal day, a person may use a smart phone, a tablet device, and a laptop computer. Automobiles and commercial vehicles have also come to rely upon electronic systems to control and monitor many features and operations. Modern home appliances such as, washers, dryers, and refrigerators may be driven and controlled by electronic systems. Manufacturing facilities, building heating and cooling systems, and farming equipment may now rely upon electronic sensors and control systems.

Advancements in communication technologies have allowed for even relatively simple electronic devices to communicate with other devices and computing systems over a computer network. For example, an electronic device in a manufacturing system may monitor various aspects of the manufacturing process and communicate monitoring data to other devices in the manufacturing system. Similarly, electronic sensors embedded in a building control system may monitor and communicate details regarding operation of the building's heating, cooling, and ventilation systems. Even home appliances offer the possibility of being configured with communication capabilities for the purpose of transmitting status and receiving external control communications.

DETAILED DESCRIPTION

Figure 1:
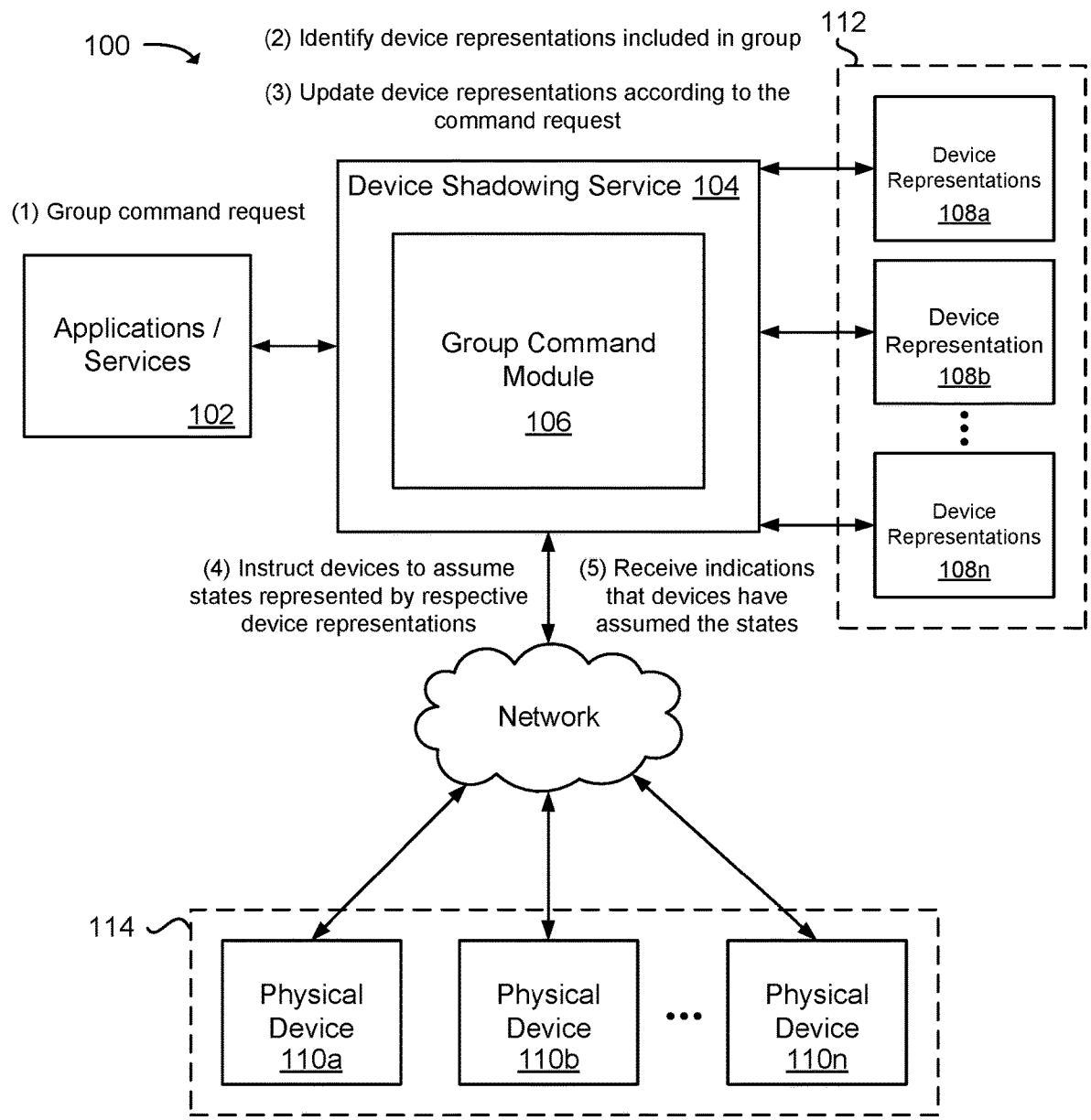
FIG. 1 is a block diagram illustrating an example system for managing commands associated with a group of device representations.

A technology is described for managing commands associated with a group of physical devices represented by device representations stored by a device shadowing service. A physical device may be one of many devices that create a large network of addressable devices. This entire "network" is commonly referred to as the Internet of Things (IoT). The physical devices may be network addressable and/or eventually addressable (e.g., capable of receiving relayed messages) by the device shadowing service which may be configured to manage the device representations used to represent the states of the physical devices.

A device representation may represent one or more states of a physical device. In one example, a device representation may represent a device state as a desired state (i.e., a state which a physical device may be instructed to assume) and a recorded state (i.e., a last known state of a physical device). Device representations may be grouped into groups of device representations based in part on one or more states represented by the device representations. As an example, a group of device representations may be grouped based on a device type (e.g., "lightbulb") and a last known state of the group of devices (e.g., "on").

The device shadowing service may be configured to manage communications and requests for actions directed to a group of devices represented by a group of device representations. For example, customers of the device shadowing service may request that a group of devices be instructed to perform an action by sending group commands to the device shadowing service. As a few non-limiting examples, an action may include: turning a group of devices "on" or "off"; instructing a group of devices to "open" or "close"; or instructing a group of devices to display a notification, report sensor data, or performing some other type of device function.

In response to receiving a group command request, the device shadowing service may be configured to instruct physical devices included in a group of devices to perform the action indicated by the group command. In one example, a desired state represented by a group of device representations may be updated to a desired state indicated by a group command and physical devices associated with the device representations may be instructed to assume the desired state represented by the device representations. As a specific example, a group command may include a desired state of "on" for a group of lightbulbs. In response to the group command, the desired state represented by device representations associated with the lightbulbs may be updated to "on" and the lightbulbs may be instructed to assume the desired state "on".

In one example, instructions for physical devices to assume a desired state may be sent in a message that is published to a named logical channel (e.g., topic) to which the physical devices may be registered to receive messages published to the named logical channel. For example, a publication/subscription broker service may maintain a list of registered physical devices. When a message is published to the named logical channel, the publication/subscription broker service forwards the message to the physical devices included in the list of registered physical devices. The forwarding of the messages may take place quickly or instantly (practically speaking) using parallel processing provided by the publication/subscription broker service.

In response to receiving instructions from the device shadowing service, the physical devices may perform the action specified in the instructions and send an acknowledgment that the action was performed. For example, the physical devices may assume a desired state or perform some function as instructed by the device shadowing service and send acknowledgements to the device shadowing service that the physical devices have assumed the state or performed the function.

FIG. 1 is a block diagram illustrating a high level example of a system 100 for managing commands associated with a group of devices 114 represented using a group of device representations 112. The system 100 may include a device shadowing service 104 configured to manage device representations 108a-n that represent states of physical devices 110a-n. As illustrated, the device shadowing service 104 may include a group command module 106 configured in part to execute group commands. The group commands may be received from applications, devices, and/or services 102 that are in communication with the device shadowing service 104 by way of one or more networks.

A device representation 108a-n may be an electronic representation (e.g., a data object) of a physical device 110a-n that may be referenced or accessed via a network (e.g., the internet and a virtual network of a service provider environment) and updated, even at times that the physical device 110a-n itself may be unreachable. For example, to conserve power, some battery-powered and other physical devices 110a-n may disable wireless radios when not actively transmitting data to the device shadowing service 104 or may enable the device's wireless radios only when polling the device shadowing service 104 for updates. For these and other reasons, a physical device 110a-n may connect to a network only intermittently, while an application or service 102 may attempt to interact with the physical device 110a-n at times that the physical device 110a-n may not be connected to the network or may not otherwise be available. In order to overcome limitations associated with intermittent connectivity, network bandwidth, and/or computing capacity, the device shadowing service 104 may maintain a cached device representation 108a-n for a physical device 110a-n that allows an application and/or service 102 to access information, such as state information, for the physical device 110a-n at any time.

A device representation 108a-n may represent one or more states of a physical device 110a-n. A state may be represented using a desired state (a state to which a physical device 110a-n may be instructed to assume) and a recorded state (the last known state of the physical device 110a-n). A state of a physical device 110a-n may be controlled using commands that instruct a physical device 110a-n to assume a specified state. For example, a physical device 110a-n may be instructed to update the device's current state (e.g., "off" or "closed") to a desired state ("on" or "open"), or a physical device 110a-n may be instructed to perform some action, such as display a notification, perform an action, provide sensor data, etc.

Device representations 108a-n may be grouped into groups of device representations 112 based in part on one or more states represented by the device representations 108a-n. A group of device representations 112 may be static or dynamic. For example, a fixed state (e.g., device type) may be used to define a group of device representations 112, and a changeable state (e.g., "on" and "off") may be used to define a dynamic group of device representations 112 where changes to the state represented by a device representation 108a-n may result in the device representation 108a-n being added or removed from the dynamic group of device representations 112. As will be appreciated, any number of states may be combined to define a group of device representations 112. As an example, a changeable state and a fixed state may be used to define a group of device representations 112.

A group command may be used to control a state assumed by physical devices 110a-n included in a group of devices 114. For example, a group command may be used to update the individual states of the physical devices 110a-n included in the group of devices 114 to a state specified by the group command (e.g., update the individual states of physical devices 110a-n included in a group of devices 114 from "off" or "closed" to "on" or "open"), or instruct the group of devices 114 to perform an action (e.g., send temperature data, location data, or image data to the device shadowing service 104, display a notification, or sound an alert).

Applications, devices, and/or services 102 may submit group commands to the device shadowing service 104 and the group commands may be forwarded to the group command module 106 configured to execute the group commands. In one example, applications and/or services 102 may publish messages that include group commands to a named logical channel associated with a group of devices 114. Named logical channels may be managed by a publication/subscription broker service (not shown) configured to send messages to clients (including applications and services 102, physical devices 110a-n, and the device shadowing service 104) registered to receive the messages published to a named logical channel. The device shadowing service 104 may be subscribed to the named logical channel allowing the device shadowing service 104 to receive messages containing group commands. In another example, an API (Application Programming Interface) call may be exposed to the applications and/or services 102, enabling the applications and/or services 102 to make group command requests to the device shadowing service 104 using the API call.

In one example, executing a group command for a group of devices 114 may involve identifying device representations 108a-n included in a group of device representations 112 associated with the group of devices 114 and updating the desired states represented by the device representations 108a-n to a state specified by the group command. Various methods may be used to execute a group command that updates the state of a group of devices 114. As one example, a group command may be executed in parallel, such that a group of device representations 112 may be divided into subgroups and a group command may be executed in parallel among the subgroups. As another example, a group command may be executed in a stepwise fashion, such that a group of devices 114 may assume a sequence of states represented by associated device representations 108a-n. Moreover, time delays between state changes may be implemented by timing state changes made to device representations 108a-n included in a group of device representations 112, resulting in time delays between messages in which physical devices 110a-n are instructed to assume the state of the associated device representations 108a-n.

In one example, a group definition for the group of device representations 112 may be used to identify individual device representations 108a-n included in the group of device representations 112. A group definition may include a membership parameter that may be used to identify device representations 108a-n having one or more states that correspond to the membership parameter. For example, device representations 108a-n may be queried using the one or more membership parameters and device states represented by device representations 108a-n identified as corresponding to the membership parameters may be returned in response to the query. In another example, device representations 108a-n may be identified using a group registry for a group of device representations 112 that includes identifiers for the device representations 108a-n. Identifiers for device representations 108a-n included in a group of device representations 112 may be used to query the device representations 108a-n for device states represented by the device representations 108a-n.

In some examples, a group definition for a group of device representations 112 may include a membership parameter that specifies authentication information needed to be included in the group of device representations 112. Authentication information may include, but is not limited to: a token, digital rights, a digital certificate and/or a public key of a public key-private key pair. In identifying or generating a group of device representations 112, authentication information may be used in combination with other membership parameters to query device representations 108a-n and identify device representations 108a-n associated with the authentication information. For example, customer authentication information may be used to identify device representations 108a-n that are accessible to a customer in response to a customer request to execute a group command.

After the desired states represented by the device representations 108a-n have been updated to the state specified by the group command, the physical devices 110a-n associated with the device representations 108a-n may be instructed to assume the desired state. In one example, instructions to a group of devices 114 to perform an action (e.g., assume a desired state or perform a function) may be included in a message published to a named logical channel subscribed to by the physical devices 110a-n. The physical devices 110a-n may receive the message and perform the action. In another example, the physical devices 110a-n may be instructed to perform the action the next time that the physical devices 110a-n connect to the device shadowing service 104. In yet another example, the device shadowing service 104 may establish a network connection with an individual physical device 110a-n using a network address for the physical device 110a-n and send the instructions to perform the action to the physical device 110a-n, such that the instructions may be sent via individual network connections to each of the physical devices 110a-n included in the group of devices 114.

After assuming the desired state, the physical devices 110a-n included in the group of devices 114 may report the state change to the device shadowing service 104. In the case that a group command instructs the physical devices 110a-n to update a current state to a desired state, the physical devices 110a-n may report actual states to the device shadowing service 104 and recorded states represented by the device representations 108a-n may be updated to represent the actual states of the physical devices 110a-n. In one example, the physical devices 110a-n may publish messages to a named logical channel subscribed to by the device shadowing service 104 indicating that the physical devices 110a-n have assumed the desired state. The device shadowing service 104 may receive the individual messages from the physical devices 110a-n and update recorded states represented by respective device representations 108a-n to the actual states of the physical devices 110a-n in response to receiving the messages.

In some examples, physical devices 110a-n included in a group of devices 114 may be instructed to perform an action specified by a group command without first updating a group of device representations 112 associated with the group of devices 114. As an example, in response to a group command that instructs a group of devices 114 to perform a device function (e.g., obtain sensor data, display information, sound an alert, etc.), physical devices 110a-n included in the group of devices 114 may be instructed to perform the function and acknowledge that the function was performed. Thereafter, a group of device representations 112 associated with the group of devices 114 may be updated if needed. As one specific example, a group of devices 114 may be instructed to display a notification and acknowledge that the notification was displayed. As another specific example, a group of devices 114 may be instructed to provide sensor data, and a group of device representations 112 associated with the group of devices 114 may be updated to represent the sensor data received from the group of devices 114.

In one example, an application and/or service 102 associated with a group command request may be provided with information related to execution of the group command. For example, an indication of success or failure may be returned to the application and/or service 102, or periodic updates that indicate the progress of physical devices 110a-n assuming a desired state or performing an action may be provided to the application and/or service 102. In one example, determining whether a physical device 110a-n has assumed a desired state may involve querying device representations 108a-n associated with the physical devices 110a-n for recorded states represented by the device representations 108a-n and determining whether the recorded states correspond to a desired state indicated by a group command.

Information regarding the results or progress of a group command may be included in a message that is published to a named logical channel and applications and/or services 102 subscribed to the named logical channel may receive the message. As a specific example, information regarding execution of a group command may indicate that 78% of physical devices 110a-n have assumed a desired state or performed a function and 22% of physical devices 110a-n have not yet assumed the desired state or performed the function. In one example, progress of a group command may be provided once a response threshold for receiving indications that the physical devices 110a-n have assumed a desired state has been exceeded. As an example, after receiving indications from 5%, 10%, or 20% of physical devices 110a-n included in a device group 114, a message indicating the progress of the group command may be provided to applications and/or services 102 subscribed to receive the message.

In an example where an application and/or service 102 may be periodically provided with information regarding the progress of the execution of a group command, the information provided may indicate which physical devices 110a-n have acknowledged assuming a desired state or performing a function, and which physical devices 110a-n that have not yet acknowledged assuming the desired state or performing the function. In one example, recorded states of device representations 108a-n may be grouped into subgroups and subgroup states may be returned to an application and/or service 102 associated with a group command. A subgroup state may be an aggregation of recorded states for device representations included in a device representation subgroup. As a specific example, device representations 108a-n that have a recorded state of "on" may be grouped into a first subgroup and device representations 108a-n that have a recorded state of "off" may be grouped into a second subgroup, and information that includes subgroup states for the first and second subgroup may be periodically returned to an application and/or service 102 until the recorded state of each device representation 108a-n has been updated to correspond to a state indicated by a group command.

In another example, information regarding the progress of a command group operation provided to applications and/or services 102 may include subgroup information. As a specific example, a building may include network addressable lights that connect to the device shadowing service 104. Each floor may contain multiple lights and a subgroup state (e.g., "on" or "off") may be determined for each floor by querying device representations 108a-n configured to represent the lights. In response to a group command that turns on all lights in the building, subgroup states for each floor may be returned. For example, a message may be returned to an application and/or service 102 indicating that lights on the first floor are "on", lights on the second floor are "on", and lights on the third floor are still transitioning to "on".

In the case that a group of devices 114 is instructed to perform a function (e.g., display a notification), a running tally of acknowledgements received from the physical devices 110a-n included in the group of devices 114 may be managed by the device shadowing service 104 and an application and/or service 102 may be provided with the running tally of acknowledgements. As an illustration, in response to receiving instructions to display a notification, the physical devices 110a-n may report back to the device shadowing service 104 that the notification has been displayed, whereupon the running tally of acknowledgements may be updated, and the running tally (e.g., 87% of devices have responded) may be included in a message that may be periodically provided to the application and/or service 102 until each physical device 110a-n has acknowledged displaying the notification.

Figure 2:
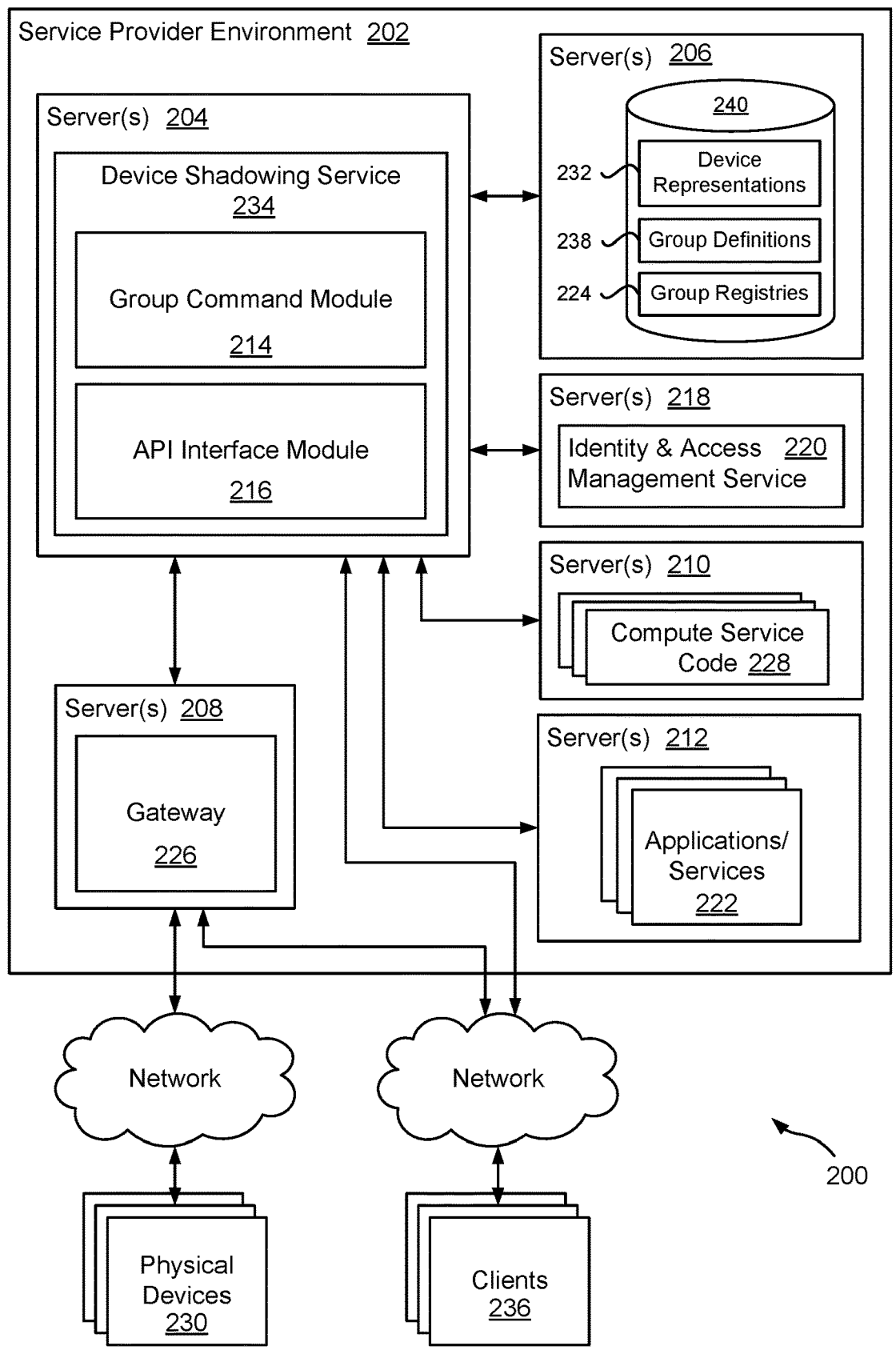
FIG. 2 is a block diagram that illustrates various example components included in a system for managing groups of device representations.

FIG. 2 illustrates components of an example system 200 on which the present technology may be executed. The system 200 may include a plurality of physical devices 230 that are in communication with a service provider environment 202 via one or more networks. Illustratively, the physical devices 230 can include connected: global positioning devices, temperature sensors, water sensors, light switches, light bulbs, power outlets, watches, media players, voice command devices, video cameras, security systems, door locks, smoke alarms, thermostats, weather sensors, vehicles, handheld devices, as well as any other device configured to communicate over a network.

The service provider environment 202 may include servers that host various components. A server 204 may host a device shadowing service 234 configured to manage device representations 232 associated with the physical devices 230. The device representations 232 may, in one example, include data objects stored using a data-interchange format like JSON (JavaScript Object Notation) or XML (eXtensible Markup Language) in an object data store, a NoSQL data store, a relational data store, or other types of data stores. The device representations 232 may be accessible to clients 236 that may operate outside of the service provider environment 202, and applications and/or services 222 hosted on a server 212 within the service provider environment 202. The device representations 232 may be accessible to the clients 236, applications and services 222 via the device shadowing service 234 at any time without the need to wake up or otherwise contact an associated physical device 230.

The device shadowing service 234 may be configured to manage device states represented by the device representations 232. For example, the device shadowing service 234 may update device states represented by device representations 232 in response to group commands received from clients 236 and/or applications and services 222, or in response to output received from the physical devices 230 represented by the device representations 232. In one example, a device representation 232 may represent a device state as a recorded state and a desired state. The recorded state may be the last know state of the physical device 230 represented by the device representation 232, and the desired state may be a state to which the physical device 230 may be instructed to assume. For example, a client 236, application and/or service 222 may request that a group of physical devices 230 assume a desired state. In response, the device shadowing service 234 may be configured to update the desired states of device representations 232 that represent the group of physical devices 230 to the desired state. The physical devices 230 may then be instructed to assume the desired state. Thereafter, indications that the physical devices 230 have assumed the desired state may be received and the recorded states of the device representations 232 may be updated to the state assumed by the physical devices 230.

In one example, the device shadowing service 234 may include an API interface module 216, a group command module 214, and other modules. The API interface module 216 may be configured to provide clients 236, applications and/or services 222 with an endpoint to the device shadowing service 234 by exposing an API call to clients 236, applications and/or services 222 that may be used to submit group command requests, as well as other types of requests to the device shadowing service 234. Requests made to the device shadowing service 234 via the API interface module 216 may be authenticated using an identity and access management service 220 hosted on a server 218 in the service provider environment 202. For example, security authentication may be performed for group command requests submitted by a customer to ensure that the customer is assigned permissions that allow the customer to submit group commands directed to a group of physical device 230.

Figure 3:
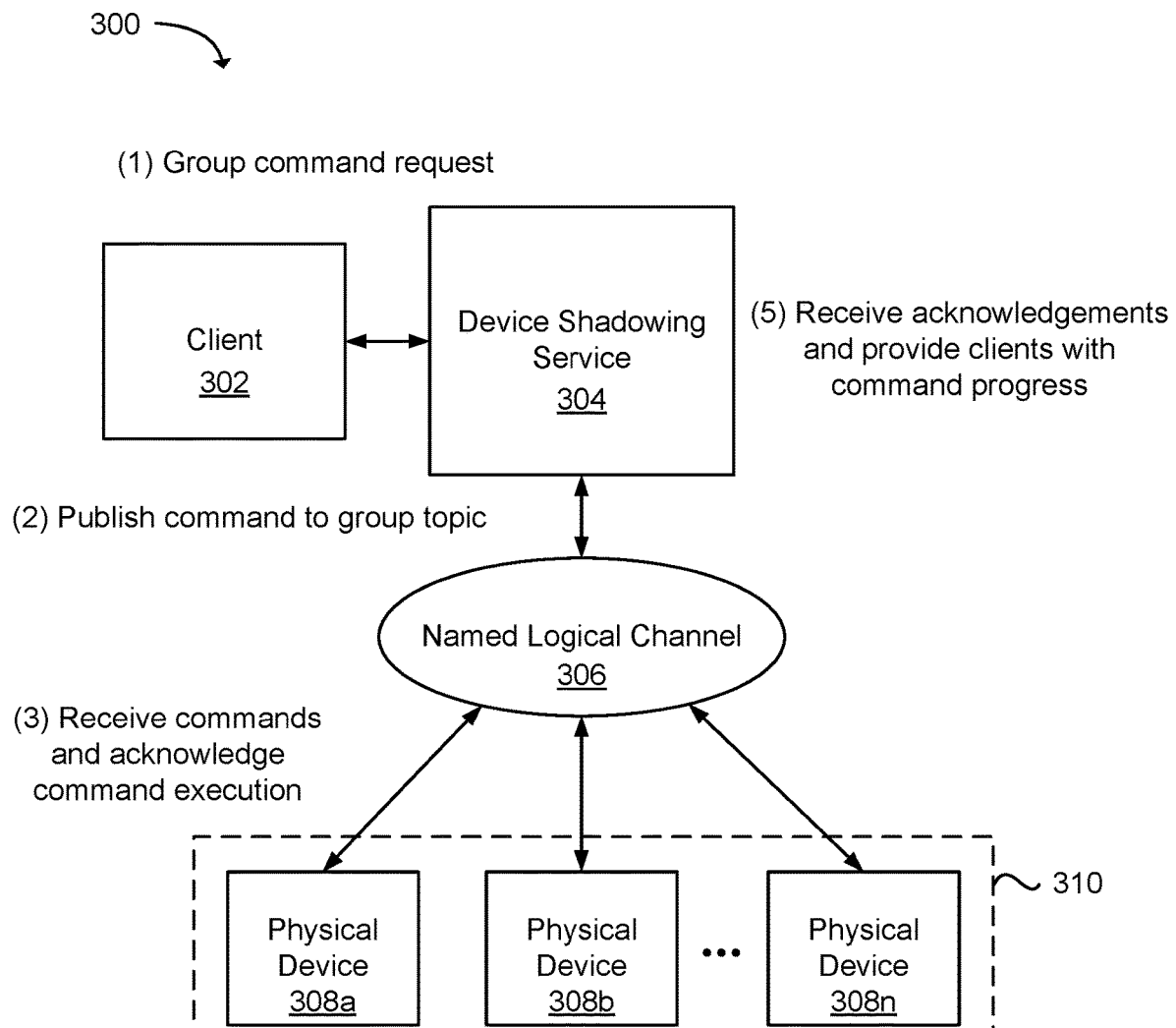
FIG. 3 is a block diagram illustrating an example system and method for managing communications associated with group commands using named logical channels.

In another example, group commands may be submitted to the device shadowing service 234 using messages published by clients 236, applications and/or services 222 to named logical channels associated with groups of physical device 230 as described in relation to FIG. 3. The service provider environment 202 may include a server 208 that hosts a gateway 226 configured to exchange messages using a publication/subscription broker service, which enables one-to-one and one-to-many communications. A one-to-many communication pattern may allow an exchange of messages between the device shadowing service 234, physical devices 230, clients 236, applications and services 222, as well as other components subscribed to receive the messages. For example, a component may publish a message to a named logical channel (e.g., topic) and the message may be distributed to subscribed system components. The gateway 226 may support protocols that include MQTT (Message Queue Telemetry Transport), CoAP (Constrained Application Protocol), HTTP (Hyper Text Transport Protocol), or HTTPS (Hyper Text Transport Protocol Secure) protocols, as well as proprietary or legacy protocols. The gateway 226 may be configured to scale automatically to support a number of physical devices 230 (thousands, millions, or even billions) using computing resources included in the service provider environment 202.

Group commands submitted to the device shadowing service 234 via the API interface module 216 or the gateway 226 may be provided to the group command module 214 configured to execute the group commands. In one example, the group command module 214 may be configured to identify device representations 232 associated with a group of physical devices 230 in response to receiving a group command. A group definition 238 or a group registry 224 may be used to identify the device representations 232. A group command may include a group identifier which may be used to identify a group definition 238 or group registry 224 associated with the group identifier.

A group definition 238 may include one or more membership parameters used to identify device representations 232 associated with a group of physical devices 230. As a specific example, a group definition 238 may be used to identify device representations 232 for a group of lights located on the second floor of a building. In one example, a group definition 238 may be used to generate a dynamic group of device representations. A dynamic group of device representations may be based in part on changeable device states represented by device representations 232 included in the group. Device representations 232 included in a dynamic group may be identified using one or more membership parameters included in a group definition 238. The membership parameters may be used to identify device representations 232 that represent device states that correspond to the membership parameters. As a specific example, a group definition 238 for a dynamic group of network addressable lights may include membership parameters used to identify device representations 232 that represent network addressable lights and have a recorded state of "on".

In one example, the group command module 214 may be configured to update device representations 232 identified as being included in a group of device representations to a state indicated in a group command. For example, the group command module 214 may be configured to iterate through the device representations 232 included in a group of device representations and update a desired state to the state indicated in the group command. Physical devices 230 associated with the device representations 232 may then be instructed to assume the desired state represented by the device representations 232. For example, a message that includes the instructions may be published to a named logical channel to which the physical devices 230 may be subscribed. After receiving the message, a physical device 230 may assume the desired state indicated in the message and publish a second message to the named logical channel that indicates that the physical device 230 has assumed the desired state. Messages from the physical devices 230 indicating that the physical devices 230 have assumed the desired state may be received at the device shadowing service 234 and recorded states represented by device representations 232 associated with the physical devices 230 may be updated to the states indicated in the messages.

The group command module 214 may be configured to return an indication of success or failure of a group command to a client 236, application and/or service 222 associated with the group command. In one example, success or failure of a group command may be determined by querying device representations 232 associated with a group of physical devices 230 for recorded states represented by the device representations 232 and determining whether the recorded states correspond to a state indicated by a group command. Illustratively, after publishing a message instructing physical devices 230 to assume a state indicated in a group command, the group command module 214 may query device representations 232 after a period of time or periodically to determine whether the recorded states represented by the device representations 232 correspond to a state indicated by the group command. In the case that the recorded states correspond to the state indicated by the group command, the group command module 214 may send an indication to the client 236, application and/or service 222 that the group command was successful. In the case that only a portion of the recorded states represented by the device representations 232 correspond to the state indicated by the group command, the group command, for example, may be retried and a client 236, application and/or service 222 associated with the group command may be notified that execution of the group command is ongoing.

In one example, the group command module 214 may be configured to aggregate acknowledgments received from physical devices 230 indicating that the physical devices 230 have assumed a state or performed an action as instructed by a group command and notify a client 236, application and/or service 222 after acknowledgements have been received from each device included in a group of physical devices 230. In some examples, a client 236, application and/or service 222 may be provided with updates as acknowledgements are received from physical devices 230. For example, the group command module 214 may send messages indicating a number of physical devices 230 that have sent acknowledgements and a number of physical devices 230 that have not yet sent acknowledgements.

In another example, a group command may be executed using an instance of compute service code 228 hosted on a server 210. For example, the group command module 214 may be configured to identify a group definition 238 for a group of device representations in response to group command and provide the group definition 238 to the instance of a compute service code 228 configured to execute the group command. The instance of compute service code 228 may be configured to identify device representations 232 using the group definition 238 and instruct physical devices 230 associated with the device representations 232 to perform an action defined by the group command.

An instance of a compute service code 228 may include a segment of program code that may be like a function, and the program code may receive parameters, perform processing, and provide return values. In one aspect, the compute service code may execute on a managed compute service code platform for back-end web services that runs a defined compute service code on a computing instance hosted in a service provider environment as described in relation to FIG. 5. That is, the compute service code 228 may execute in a compute service that runs code in response to requests to execute the compute service code 228, and automatically manage the compute resources used by that compute service code 228. Once a compute service code 228 has been executed and results have been returned, the compute service code 228 and results may be removed from the memory of a computing instance or software container used to execute the compute service code 228. The compute service code 228 provides for building smaller, on-demand applications that may be responsive to events and new information.

The various processes and/or other functionality included in the system 200 may be executed on one or more processors that are in communication with one or more memory modules. The system 200 may include a number of servers that are arranged, for example, in one or more server banks or computer banks or other arrangements. The servers may support the service provider environment 202 using hypervisors, virtual machine monitors (VMMs) and other virtualization software as described later in association with FIG. 4.

Device representations 232, group definitions 238, and group registries 224 may be stored in one or more data stores 240 hosted by servers 206. In one example, a key value data store may be used to store device representations 232. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

API calls, procedure calls or other network commands that may be made in relation to the modules and services included in the service provider environment 202 and may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

One or more networks used by the system 200 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

FIG. 3 is a block diagram illustrating an example system and method 300 for managing communications associated with group commands using named logical channels. As described earlier, a named logical channel, also referred to as a "topic", may be a communication channel managed by a publication/subscription broker service. Messages published to a named logical channel may be distributed to system components that are subscribed to the named logical channel, enabling one-to-many communication among the system components.

As illustrated, a client 302 may send a group command request to a device shadowing service 304. The group command request may be sent in a message published to a named logical channel subscribed to by the device shadowing service 304, or the group command request may be sent using an API call. The device shadowing service 304 may receive the group command request and identify a group of devices 310 associated with the group command request. For example, the group command request may include a group name that may be used to identify the group of devices 310. As an illustration, a group command request directed to a group of network addressable lights may include the group name "floor1_light_group", which may be used to identify a device group 310 assigned the name "floor1_light_group".

After identifying the group of devices 310 associated with the group command request, a named logical channel 306 associated with the group of devices 310 may be identified. Physical devices 308*a-n* included in the group of devices 310 may be registered to receive messages published to the named logical channel 306. A message may contain instructions associated with a group command. As an example, a message may instruct a physical device 308*a-n* to assume a state (e.g., "on" or "off", "closed" or "open", "empty" or "full", display information, sound a notification, obtain sensor data, etc.).

After the named logical channel 306 associated with the group of devices 310 has been identified, a message containing instructions indicated in the group command may be published to the named logical channel 306. The publication/subscription broker service may forward the message to device subscriptions. That is, the message may be pushed to a device endpoint using a push method, or the message may be pulled by the physical devices 308*a-n* from the publication/subscription broker service.

The physical devices 308*a-n* may receive the message and acknowledge receipt to the publication/subscription broker service. The physical devices 308*a-n* may then assume the state as instructed in the message. In the case that the message instructs the physical devices 308*a-n* to assume a desired state, a physical device 308*a-n* may be configured to update the state of the physical device 308*a-n* to the desired state and publish a message to the named logical channel 306 acknowledging that the desired state has been assumed. The device shadowing service 304 may receive the message published to the named logical channel 306 and update a recorded state represented by a device representation associated with the physical device 308*a-n* to the state indicated in the message. In the case that the message instructs the physical devices 308*a-n* to perform a device function, a physical device 308*a-n* may perform the function and publish a message to the named logical channel 306 acknowledging that the function was performed, or provide requested information (e.g., sensor data).

Messages received from the physical devices 308*a-n* acknowledging a state update or performance of a function may be tracked, such that a determination that the group command was successful may be made. The results of the group command may be provided to the client 302 (e.g., success or failure). In some examples, the client 302 may be provided with information related to execution of the group command. For example, the client 302 may be provided with information related to acknowledgements that have been received from the physical devices 308*a-n*, as well as information about physical devices 308*a-n* that may have failed to update a state or perform an action.

Figure 4:
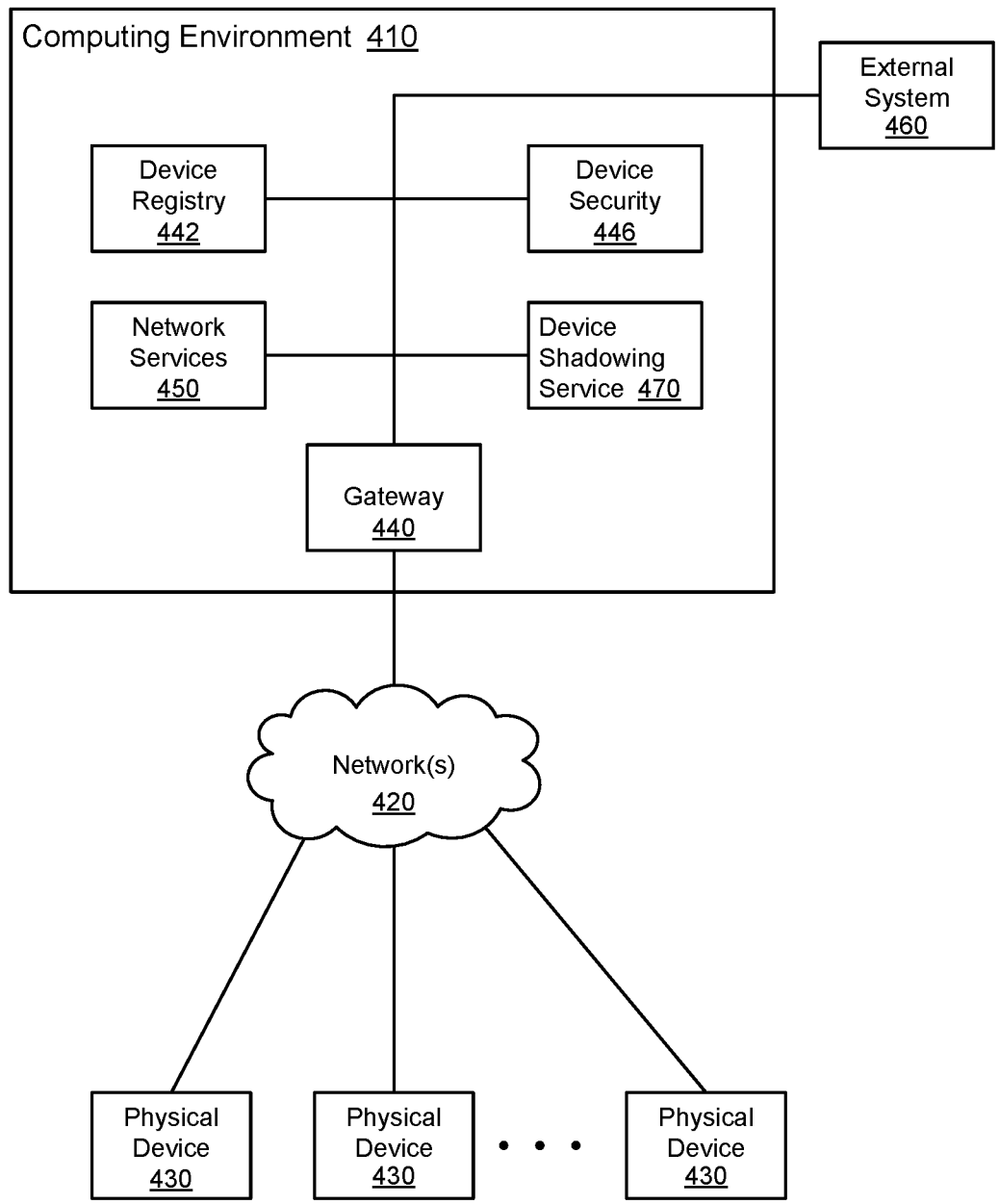
FIG. 4 is a block diagram illustrating an example computer networking architecture for providing devices access to network services.

FIG. 4 is a block diagram illustrating an example service provider environment 410 with which the physical devices 430 described earlier may communicate. The service provider environment 410, which may be referred to as a device communication environment or system that comprises various resources made accessible via a gateway server 440 to the physical devices 430 that access the gateway server 440 via a network 420. The physical devices 430 may access the service provider environment 410 in order to access services such as a device shadowing service 470, data storage, and computing processing features. Services operating in the service provider environment 410 may communicate data and messages to the physical devices 430 in response to requests from the physical devices 430 and/or in response to computing operations within the services.

The service provider environment 410 may comprise communicatively coupled component systems 440, 442, 446, 450 and 470 that operate to provide services to the physical devices 430. The gateway server 440 may be configured to provide an interface between the physical devices 430 and the service provider environment 410. The gateway server 440 receives requests from the physical devices 430 and forwards corresponding data and messages to the appropriate systems within the service provider environment 410. Likewise, when systems within the service provider environment 410 attempt to communicate data instructions to the physical devices 430, the gateway server 440 routes those requests to the correct physical device 430.

The gateway server 440 may be adapted to communicate with varied physical devices 430 using various different computing and communication capabilities. For example, the gateway server 440 may be adapted to communicate using either TCP (Transmission Control Protocol) or UDP (User Datagram Protocol) protocols. Likewise, the gateway server 440 may be programmed to receive and communicate with the physical devices 430 using any suitable protocol including, for example, MQTT, CoAP, HTTP, and HTTPS. The gateway server 440 may be programmed to convert the data and instructions or messages received from the physical devices 430 into a format that may be used by other server systems comprised in the service provider environment 410. In one example, the gateway server 440 may be adapted to convert a message received using the HTTPS protocol into a JSON formatted message that is suitable for communication to other servers within the service provider environment 410.

The gateway server 440 may store, or may control the storing, of information regarding the physical devices 430 that have formed a connection to the particular gateway server 440 and for which the particular gateway server 440 may be generally relied upon for communications with the physical device 430. In one example, the gateway server 440 may have stored thereon information specifying the particular physical device 430 such as a device identifier. For each connection established from the particular physical device 430, the gateway server 440 may also maintain information identifying the connection. For example, a connection identifier may be generated and stored for each connection established with a particular physical device 430. Information relating to the particular connection may also be stored. For example, information identifying the particular socket of the gateway server 440 on which the connection was established, as well as information identifying the particular protocol used by the physical device 430 on the connection may be stored by the gateway server 440. Information such as the socket and protocol may be used in order to facilitate further communications via the particular connection.

In one example, the gateway server 440 may communicate via any suitable networking technology with a device registry server 442. The device registry server 442 may be adapted to track the attributes and capabilities of each physical device 430. In an example, the device registry sever 442 may be provisioned with information specifying the attributes of the physical devices 430. The device registry server 442 may comprise data specifying rules or logic (e.g., automation rules) for handling various requests that may be received from the physical devices 430. The device registry server 442 may be programmed to convert specialized device functions or commands received in particular communication protocols such as, for example HTTPS, MQTT, CoAP, into functions or commands using particular protocols that are understood by other of the servers in the service provider environment 410. In one example, the device registry server 442 may be provisioned with information specifying that upon receipt of a particular request from a particular physical device 430, a request should be made to store the payload data of the request in a particular network service server 450. The device registry server 442 may be similarly programmed to receive requests from servers 442, 450 and convert those requests into commands and protocols understood by the physical devices 430.

The device shadowing service server 470 maintains state information for each connected physical device 430. In an example embodiment, the device shadowing service server 470 maintains for each physical device 430 that has connected to the service provider environment 410 information specifying a plurality of states. In an example scenario, the device shadowing service server 470 may comprise a recorded state and a desired state. The recorded state represents the existing state of the particular physical device 430 as presently known to the device shadowing service server 470. The device shadowing service server 470 may be configured to manage groups of device representations and manage communications associated with group commands as described earlier. The device shadowing service server 470 communicates with the device gateway 440 in order to communicate requests to update a status to a particular physical device 430. For example, the device shadowing sever 470 may communicate to the device gateway 440 a sequence of state transition commands that update the status of a physical device 430. The device gateway 440 may, in response, communicate the appropriate commands formatted for the particular device.

The device security server 446 maintains security-related information for the physical devices 430 that connect to the service provider environment 410. In one example, the device security server 446 may be programmed to process requests to register physical devices 430 with the service provider environment 410. For example, entities such as device manufacturers, may forward requests to register physical devices 430 with the service provider environment 410. The device security server 446 receives registration requests and assigns unique device identifiers to physical devices 430 which use the device identifiers on subsequent requests to access the service provider environment 410. The device security server 446 stores, for each registered device, authentication information that may be provided during the device registration process. For example, a request to register a device 430 may comprise information identifying the physical device 430 such as a device serial number and information for use in authenticating the physical device 430. In one example, the information may comprise a digital certificate and may comprise a public key of a public key-private key pair. The information may be stored in relation to the assigned device identifier for the particular physical device 430. When the physical device 430 subsequently attempts to access the service provider environment 410, the request may be routed to the device security server 446 for evaluation. The device security server 446 determines whether authentication information provided in the request is consistent with the authentication information stored in relation to the device identifier and provided during the registration process.

The device security server 446 may be further programmed to process request to associate particular entities (individuals or organizations) with particular physical devices 430. The device security server 446 may be adapted to receive requests to register entities, which may be, for example, individuals, users, accounts, and/or organizations, as authorized to control or communicate with a particular physical device 430. In one example, a request may be received from an individual or organization that may have purchased a physical device 430 from a manufacturer. For example, the device may be a dishwasher, thermostat, or lighting assembly that an individual or organization purchased from the manufacturer. The individual or organization may initiate a request to register the physical device 430 with the individual or an organization with which the organization is associated. The request may be routed to a web services server which may be comprised in service provider environment 410 or which communicates the request to the service provider environment 410. The request identifies the physical device 430 and the particular entity (individual or organization) that is requesting to be associated with the physical device 430. In one example, the request may comprise a unique device identifier that was assigned when the physical device 430 was registered with the system. The request further may comprise information uniquely identifying the entity that is registering as having authority to communicate with and/or control the particular physical device 430.

The device security server 446 stores the information identifying the particular entity in relation with the device identifier. When the particular entity subsequently attempts to control or communicate data to the particular physical device 430, the device security server 446 may use the information to confirm that the particular entity is authorized to communicate with or control the particular physical device 430. When an entity that has not been registered as being authorized to communicate with the physical device 430 attempts to communicate with or control the physical device 430, the device security server 446 may use the information stored in the device security server 446 to deny the request.

A network services server 450 may be any resource or processing server that may be used by any of servers 440, 442, 446, or 470 in processing requests from the physical devices 430. In one example, network services server 450 may provide data storage and retrieval services and/or on-demand processing capacity. In an example scenario, the network services server 450 may be any of numerous network accessible services including, for example, web or cloud-based services. In one example, the web services server 450 may be programmed to provide particular processing for particular physical devices 430 and/or groups of physical devices 430. For example, a network services server 450 may be provisioned with software that coordinates the operation of a particular set of physical devices 430 that control a particular manufacturing operation.

Servers 440, 442, 446, 450, and 470 may be communicatively coupled via any suitable networking hardware and software. For example, the servers may communicate via a local area network or wide area network.

An external system 460 may access service provider environment 410 for any number of purposes. In one example, an external system 460 may be a system adapted to forward requests to register physical devices 430 with the service provider environment 410. For example, an external system 460 may include a server operated by or for a device manufacturer that sends requests to service provider environment 410, and device security server 446 in particular, to register physical devices 430 for operation with service provider environment 410. Similarly, the external system 460 may be a system operated to provide a gateway for entities (individuals or organizations) to register an ownership or control relationship with a particular physical device 430.

The physical devices 430 may be any devices that may be communicatively coupled via a network 420 with the service provider environment 410. For example, the physical devices 430 may be computing devices such as smart phones and tablet computers, automobiles, appliances such as washers and driers, industrial sensors, switches, control systems, etc. In one example, each of physical devices 430 may communicate over the network 420 to store data reflecting the operations of the particular physical device 430 and/or to request processing provided by, for example, network services server 450. While FIG. 3 depicts three physical devices 430, it will be appreciated that any number of physical devices 430 may access the service provider environment 410 via the gateway server 440. Further it will be appreciated that the physical devices 430 may employ various different communication protocols. For example, some physical devices 430 may transport data using TCP, while others may communicate data using UDP. Some physical devices 430 may use MQTT, while others may use CoAP, and still others may use HTTPs. It will also be appreciated that each of physical devices 430 may be programmed to send and receive particular functions or commands in its requests that are not compatible with other devices or even the systems within service provider environment 410. The gateway server 440 may be programmed to receive and, if needed, attend to converting such requests for processing with the service provider environment 410.

Figure 5:
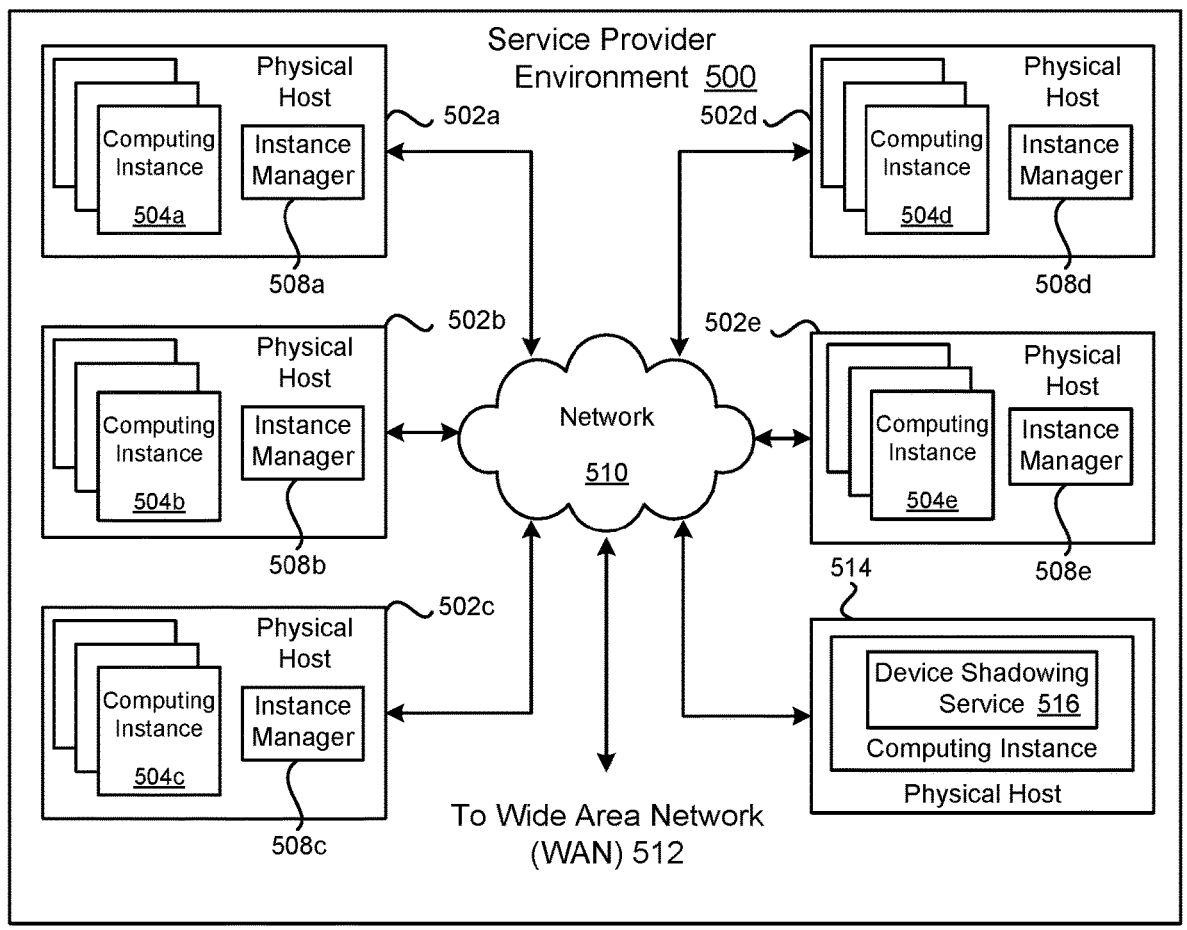
FIG. 5 is a block diagram that illustrates an example service provider environment that includes a device shadowing service.

FIG. 5 is a block diagram illustrating an example service provider environment 500 that may be used to execute and manage a number of computing instances 504a-e. In particular, the service provider environment 500 depicted illustrates one environment in which the technology described herein may be used. The service provider environment 500 may be one type of environment that includes various virtualized service resources that may be used, for instance, to host computing instances 504a-e.

The service provider environment 500 may be capable of delivery of computing, storage and networking capacity as a software service to a community of end recipients. In one example, the service provider environment 500 may be established for an organization by or on behalf of the organization. That is, the service provider environment 500 may offer a "private cloud environment." In another example, the service provider environment 500 may support a multi-tenant environment, wherein a plurality of customers may operate independently (i.e., a public cloud environment). Generally speaking, the service provider environment 500 may provide the following models: Infrastructure as a Service ("IaaS"), Platform as a Service ("PaaS"), and/or Software as a Service ("SaaS"). Other models may be provided. For the IaaS model, the service provider environment 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on a computing service platform provided by the service provider environment 500 without incurring the cost of buying and managing the underlying hardware and software. The SaaS model allows installation and operation of application software in the service provider environment 500. End customers may access the service provider environment 500 using networked client devices, such as desktop computers, laptops, tablets, smartphones, etc. running web browsers or other lightweight client applications, for example. Those familiar with the art will recognize that the service provider environment 500 may be described as a "cloud" environment.

The particularly illustrated service provider environment 500 may include a plurality of physical hosts 502a-e. While six physical hosts are shown, any number may be used, and large data centers may include thousands of physical hosts. The service provider environment 500 may provide computing resources for executing computing instances 504a-e. Computing instances 504a-e may, for example, be virtual machines. A virtual machine may be an instance of a software implementation of a machine (i.e. a computer) that executes applications like a physical machine. In the example of a virtual machine, each of the physical hosts 502a-e may be configured to execute an instance manager 508a-e capable of executing the instances. The instance manager 508a-e may be a hypervisor, virtual machine monitor (VMM), or another type of program configured to enable the execution of multiple computing instances 504a-e on a single physical host. Additionally, each of the computing instances 504a-e may be configured to execute one or more applications.

A physical host 514 may execute a device shadowing service 516 configured to execute the functions described earlier. In one example, the device shadowing service 516 may be hosted by one or more computing instances 504a-e. A network 510 may be utilized to interconnect the service provider environment 500 and the physical hosts 502a-e, 514. The network 510 may be a local area network (LAN) and may be connected to a Wide Area Network (WAN) 512 or the Internet, so that end customers may access the service provider environment 500. The network topology illustrated in FIG. 5 has been simplified, many more networks and networking devices may be utilized to interconnect the various computing systems disclosed herein.

Figure 6:
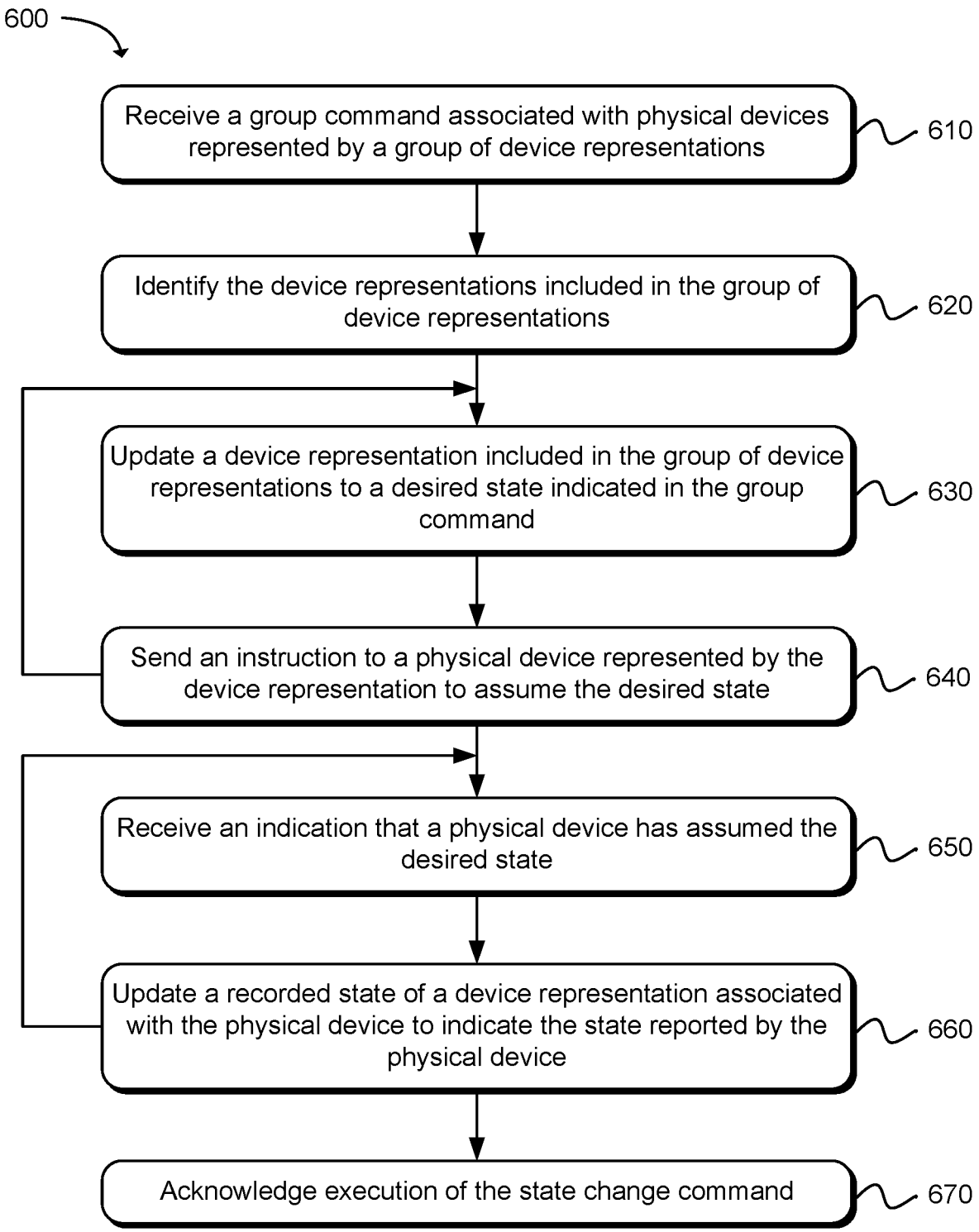
FIG. 6 is a flow diagram illustrating an example method for managing a group command for a group of devices represented by device representations.

FIG. 6 is a flow diagram illustrating an example method 600 for managing a group command for a group of devices represented by device representations. The method may include receiving a group command associated with physical devices represented by a group of device representations, as in block 610. The group command may be received at a device shadowing service configured to manage the group of device representations. The group command may include instructions for the physical devices to assume a desired state (e.g., "on", "off", "open", "closed", etc.).

In response to receiving the group command, the device representations included in the group of device representations may be identified, as in block 620. For example, the group command may include an identifier for the group of device representations which may be used to locate a group record that identifies the device representations included in the group of device representations. In one example, a network address for each physical device represented by the device representations may be identified. A network address for a physical device may be used to send an instruction to the physical device to assume the desired state.

After identifying the device representations, as in block 630, a desired state represented by each of the device representations may be updated to the state indicated by the group command, and as in block 640, an instruction may be sent to each of the physical devices represented by the device representations instructing the physical devices to assume the desired state. That is, an iterative process may be used to update the desired states represented by the device representations and instruct the physical devices represented by the device representations to assume the desired state. As indicated above, instructions to assume the desired state may be sent to a network address associated with a device. In one example, a group of device representations may be subdivided into multiple device representation subgroups allowing for parallelization in performing updates to the device representations and sending instructions to the physical devices.

As in block 650, indications that the physical devices have assumed the desired state may be received at the shadowing service, and as in block 660, the recorded states of the device representations may be updated to indicate the reported states of the physical devices. In particular, in response to receiving an indication from a physical device that the physical device has assumed the desired state, a device representation associated with the physical device may be identified and the recorded state represented by the device representation may be updated to the state reported by the physical device (i.e., the desired state assumed by the device). After each physical device has reported back to the device shadowing service that the desired state has been assumed, as in block 670, an acknowledgement that the group command was executed may be sent to a client associated with the group command.

Figure 7:
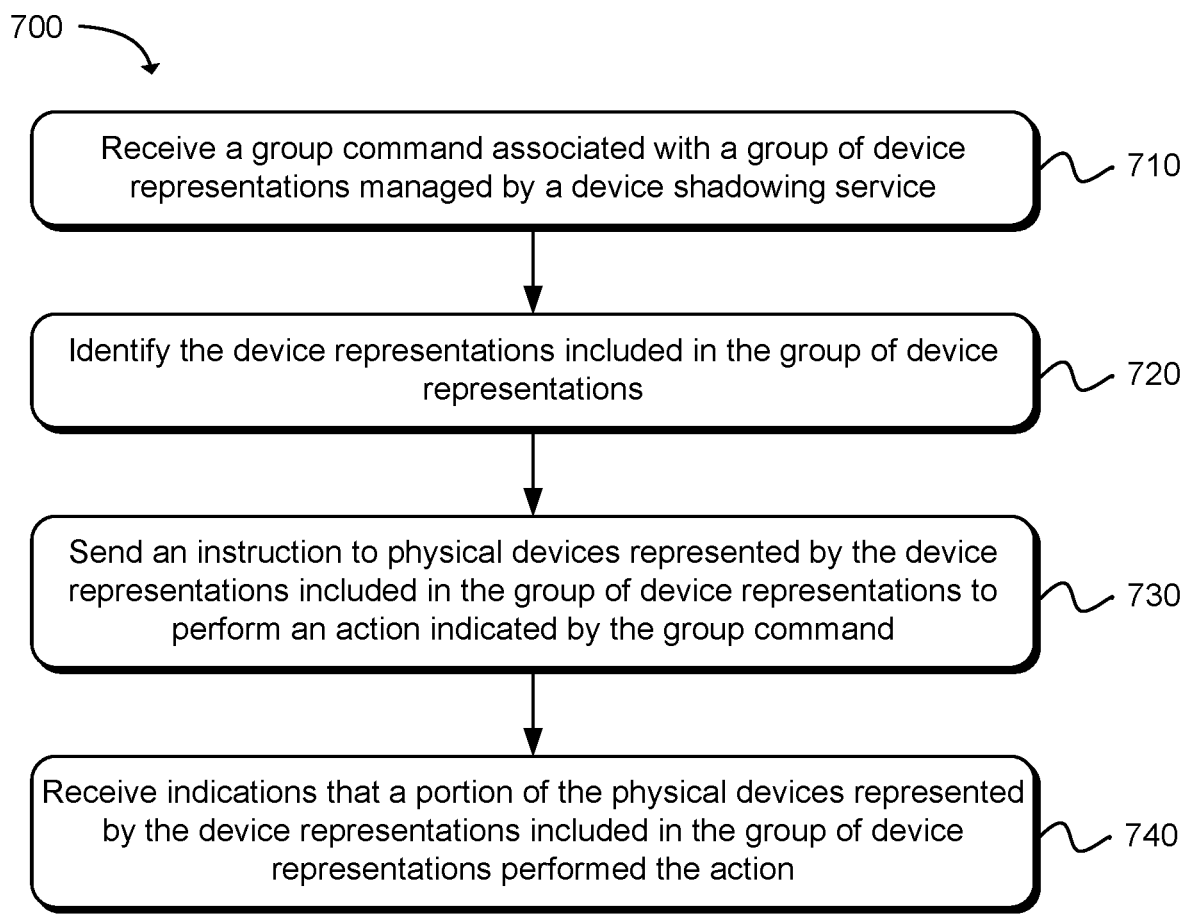
FIG. 7 is a flow diagram that illustrates an example method for executing a group command for a group of devices represented by device representations.

FIG. 7 is a flow diagram that illustrates an example method 700 for executing a group command for a group of devices represented by device representations. As in block 710, a group command associated with a group of device representations managed by a device shadowing service may be received. The device representations included in the group of device representations may represent physical devices that connect to the device shadowing service over one or more computer networks. The group command may specify an action that physical devices included in a group of devices may be instructed to perform. Illustratively, the action may include assuming a desired state specified in the group command, or the action may include performing a function (e.g., obtaining sensor data, displaying information, flashing an indicator, sounding an alarm, etc.)

As in block 720, the device representations included in the group of device representations may be identified. In one example, a group definition may be used to identify the device representations included in the group of device representations. In one example, a dynamic group of representations may be identified, wherein device representations included in the dynamic group represent a device state that corresponds to a membership parameter included in a dynamic group definition.

In one example, desired states represented by the device representations may be updated to the desired state indicated in the group command in response to receiving a group command that specifies an action to update the group of devices to a desired state. Accordingly, the next time that the physical devices included in the device group connect to the device shadowing service, the physical devices may be instructed to assume the desired state represented by the device representations associated with the physical devices.

As in block 730, an instruction may be sent to the physical devices represented by the device representations included in the group of device representations to perform an action indicated by the group command. Thereafter, as in block 740, indications may be received that at least a portion of the physical devices represented by the device representations included in the group of device representations performed the action. In the example that the action is to update the group of devices to a desired state, a recorded state represented by the device representations may be updated to the state assumed by the physical devices (which will be the desired state in most circumstances) when the physical devices acknowledge to the device shadowing service that the physical devices have assumed the desired state.

Figure 8:
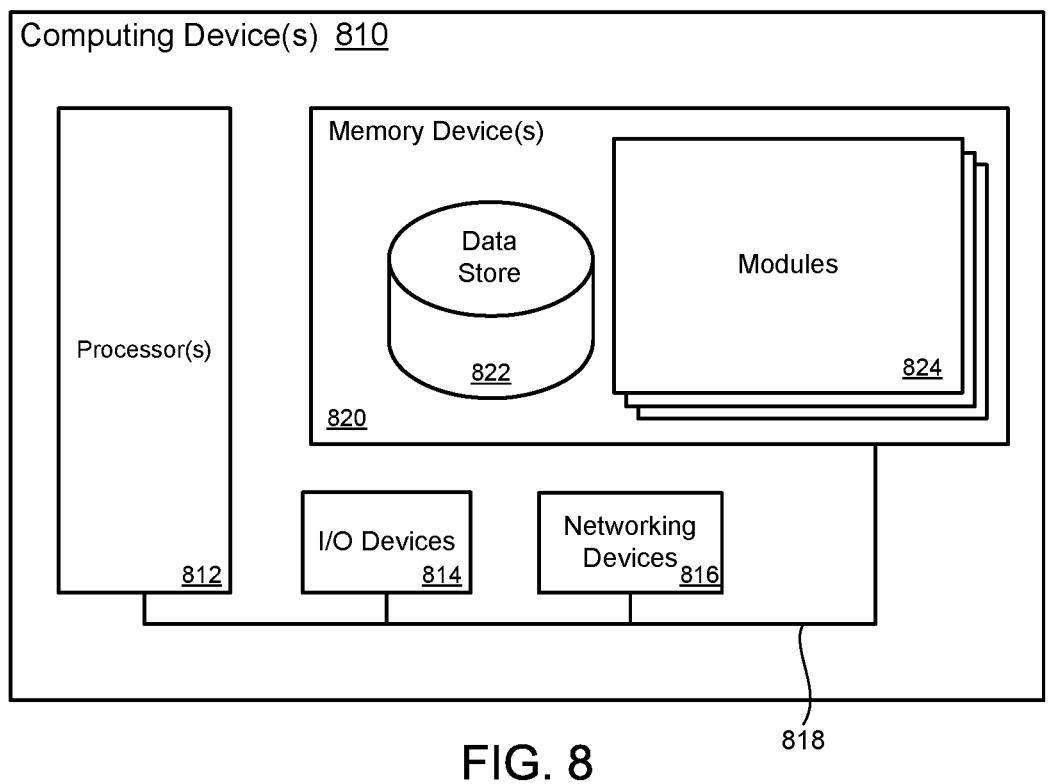
FIG. 8 is a block diagram illustrating an example of a computing device that may be used to execute a method for managing commands associated with a group of device representations.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The memory device 820 may contain modules 824 that are executable by the processor(s) 812 and data for the modules 824. For example, the memory device 820 may include an API interface module, a group command module, and other modules. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for managing group commands associated with groups of device representations comprising: at least one processor;
   a memory device including instructions that, when executed by the at least one processor, cause the system to:
   receive a group command to update desired states of device representations included in a group of device representations used to represent physical devices included in an Internet of Things (IoT) network, wherein a device shadowing service maintains the device representations in a service provider environment, and a device representation represents both (i) a desired state of a physical device that results after executing a device function associated with the group command and (ii) a recorded state indicating a last known state of the physical device after executing a device function associated with a last command;
   identify the device representations included in the group of device representations;
   update the desired state represented by the device representations to a state indicated in the group command;
   send instructions to cause the physical devices represented by the device representations included in the group of device representations to assume the desired state;
   receive indications that a set of physical devices have assumed the desired state, wherein the set of physical devices includes at least a portion of the physical devices represented by the device representations included in the group of device representations;
   update the recorded state represented by the device representations to indicate the desired state assumed by the set of physical devices associated with the device representations; and
   provide a progress of execution of the group command indicating that the set of physical devices have assumed the desired state.

2. A system as in claim 1, wherein the group command is received in a message published to a named logical channel associated with the physical devices represented by the device representations, wherein the named logical channel is managed by a publication/subscription broker service configured to send messages to clients registered to receive the messages for the named logical channel.

3. A system as in claim 1, wherein the instructions to the physical devices to assume the desired state are published to a named logical channel subscribed to by the physical devices.

4. A system as in claim 1, wherein the indications that the physical devices assumed the desired state are received in messages published to a named logical channel to which the device shadowing service is subscribed.

5. A computer implemented method, comprising:
   receiving a group command to update desired states of a group of device representations managed by a device shadowing service in a service provider environment, wherein a device representation included in the group of device representations represent both a desired state of a physical device that results after executing a device function associated with the group command and a recorded state indicating a last known state of the physical device after executing a device function associated with a last command, and wherein the group of device representations represent physical devices included in an Internet of Things (IoT) network that connect to the device shadowing service over one or more computer networks;
   identifying the device representations included in the group of device representations;
   updating the desired state of the device representations to a state indicated by the group command;
   sending an instruction to cause the physical devices represented by the device representations included in the group of device representations to assume the desired state;
   receiving indications that a set of physical devices have assumed the desired state, wherein the set of physical devices includes at least a portion of the physical devices represented by the device representations included in the group of device representations, and the indications provide a progress of execution of the group command; and
   updating the recorded state of the device representations to indicate the desired state assumed by the set of physical devices in response to receiving the indications that the set of physical devices have assumed the desired state.

6. A method as in claim 5, wherein identifying the device representations included in the group of device representations further comprises providing a group definition to an instance of a compute service code configured to execute the group command associated with the group of device representations.

7. A method as in claim 5, wherein identifying the device representations included in the group of device representations further comprises identifying a group definition having membership parameters defining the group of device representations used to identify the device representations included in the group of device representations.

8. A method as in claim 5, wherein identifying the device representations included in the group of device representations further comprises identifying a dynamic group of representations, wherein the device representations represent a device state that corresponds to a membership parameter included in a dynamic group definition.

9. A method as in claim 5, wherein identifying the device representations included in the group of device representations further comprises identifying a network address for each of the physical devices represented by the device representations.

10. A method as in claim 5, wherein sending the instruction to the physical devices further comprises sending the instruction to a plurality of network addresses associated with the physical devices represented by the device representations.

11. A method as in claim 5, further comprising determining that the physical devices have assumed the state indicated in the group command, wherein the recorded states represented by the device representations included in the group of device representations are updated in response to the indications that the physical devices assumed the desired state and a determination is made that the recorded states have been updated to correspond to the state indicated in the group command.

12. A method as in claim 5, further comprising sending an indication to a client associated with the group command that the set of physical devices have assumed the state indicated in the group command.

13. A method as in claim 5, further comprising sending periodic messages to a client associated with the group command that indicates the recorded states for the device representations included in the group of device representations.

14. A method as in claim 5, further comprising sending a message that includes grouped device states to a client associated with the group command, wherein the device representations included in the group of device representations have been queried for the recorded states and the recorded states are grouped into the grouped device states.

15. A method as in claim 5, further comprising sending a message to a client associated with the group command that includes subgroup states associated with device representation subgroups, wherein the device representations included in the group of device representations are divided into the device representation subgroups.

16. A method as in claim 15, wherein a subgroup state is an aggregation of device states represented by device representations included in a device representation subgroup.

17. A non-transitory machine readable storage medium having instructions embodied thereon, the instructions when executed by a processor:
receive a group command to update desired states of device representations included in a group of device representations used to represent physical devices included in an Internet of Things (IoT) network, wherein the physical devices connect over one or more networks to a device shadowing service configured to manage the device representations in a service provider environment, and wherein a device representation represents both a desired state of a physical device that results after executing a device function associated with the group command and a recorded state indicating a last known state of the physical device after executing a device function associated with a last command;
publish a first message to a first named logical channel, the message containing an instruction to assume a desired state indicated by the group command, wherein the physical devices are subscribed to receive the first message published to the first named logical channel which is managed by a publication/subscription broker service configured to send messages to clients registered to receive messages published to a named logical channel;
receive a plurality of messages published to a second named logical channel indicating that a set of physical devices have assumed the desired state, wherein the set of physical devices includes at least a portion of the physical devices represented by the device representations included in the group of device representations;
update the recorded states of the device representations included in the group of device representations to indicate the desired state assumed by the set of physical devices; and
provide a progress of the group command that indicates that the set of physical devices have assumed the desired state.

18. A non-transitory machine readable storage medium as in claim 17, wherein the instruction that when executed by the processor further determines that a response threshold for receiving the plurality of messages has been exceeded prior to providing progress of the physical devices assuming the desired state.

19. A non-transitory machine readable storage medium as in claim 17, wherein the group command is included in a message published to a third named logical channel subscribed to by the device shadowing service.

20. A non-transitory machine readable storage medium as in claim 17, wherein the instruction that when executed by the processor further determines that each of the physical devices represented by device representations included in a group of device representations have assumed the desired state indicated by the group command.

21. A non-transitory machine readable storage medium as in claim 17, wherein indications that the physical devices have assumed the desired state are aggregated and published to a third named logical channel to which the clients are subscribed.

* * * * *